United States Patent [19]
Werle

[11] Patent Number: 5,778,002
[45] Date of Patent: Jul. 7, 1998

[54] MULTIPLEXING/DEMULTIPLEXING SYSTEM FOR ASYNCHRONOUS HIGH AND LOW-SPEED DATA

[75] Inventor: Christian P. F. Werle, Panama City, Fla.

[73] Assignee: The United States of America as represented by the Secretary of the Navy, Washington, D.C.

[21] Appl. No.: 696,084

[22] Filed: Aug. 13, 1996

[51] Int. Cl.$^6$ ......................................................... H04J 3/02
[52] U.S. Cl. ............................ 370/474; 370/538; 370/540
[58] Field of Search .................................... 370/538, 539, 370/540, 541, 465, 468, 474

[56] References Cited

U.S. PATENT DOCUMENTS

| | | |
|---|---|---|
| 4,855,999 | 8/1989 | Chao .......................................... 370/538 |
| 5,541,926 | 7/1996 | Saito et al. ................................ 370/474 |

*Primary Examiner*—Chi H. Pham
*Assistant Examiner*—Steven Nguyen
*Attorney, Agent, or Firm*—Harvey A. Gilbert

[57] ABSTRACT

A system and method are provided for multiplexing/demultiplexing asynchronous high-speed digital data and asynchronous low-speed digital data. A first digital signal processor (DSP) receives complete low-speed data messages and is programmed to assemble each complete message into data blocks in accordance with a block format. Each data block is identical in size and includes provisions for a header that identifies the data assembled therein. A second DSP has a plurality of I/O ports, each of which has a direct memory access (DMA) associated therewith. One of the I/O ports is coupled to the first DSP to receive each complete message assembled into data blocks. The other I/O ports are coupled to a second plurality of channels transmitting asynchronous high-speed digital data. The DMAs associated with the other I/O ports are configured to assemble the high-speed data into data blocks in accordance with the same block format used for the low-speed messages. The second DSP is coupled to a data recorder so that each complete message assembled in block format and the high-speed data assembled in block format are transmitted to the data recorder when it is operated in the record mode. The first DSP can have an I/O port thereof coupled to the data recorder. The DMA associated with this I/O port is configured to route the data blocks passed thereto in accordance with the header associated with the data blocks when the data recorder is operated in the playback mode.

8 Claims, 2 Drawing Sheets

MULTIPLEXING/DEMULTIPLEXING SYSTEM FOR ASYNCHRONOUS HIGH AND LOW-SPEED DATA

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to digital data multiplexing, and more particularly to a system for multiplexing asynchronous high-speed and low-speed data into a single data stream for recordation by a high-speed, high-density digital data recorder, and for demultiplexing the recorded data output during playback of the data recorder.

BACKGROUND OF THE INVENTION

For sensor arrays such as sonar arrays, the large amounts of sensor data generated at each instant are typically transmitted in parallel at very high speeds, e.g., in excess of 1 megabyte per second in the case of some sonar data. In contrast, environmental data relating to status of the array, navigation data, etc. are generated in smaller amounts and/or less frequently. Accordingly, the smaller amounts of data are typically transmitted at much lower speeds, e.g., a few hundred bytes per second, and generally over serial data lines. It is often desirable to store both types of data together on one data recording medium. Thus, it becomes necessary to multiplex the high and low-speed data in a manner suitable for handling by the data recording medium. Furthermore, when playback of the recorded data is required, it may be important to compare the sensor data with status of the array, navigation data, etc., associated with the relevant sensor data.

SUMMARY OF THE INVENTION

Accordingly, it is an object of the present invention to provide a system and method for multiplexing asynchronous high-speed data and asynchronous low-speed data.

Another object of the present invention is to provide a system and method by which high-speed data and low-speed data can be formatted for recordation on the same recording medium.

Still another object of the present invention is to provide a system and method that can playback high-speed data and low-speed data that have been recorded together on the same recording medium.

Other objects and advantages of the present invention will become more obvious hereinafter in the specification and drawings.

In accordance with the present invention, a system and method are provided for multiplexing asynchronous high-speed digital data and asynchronous low-speed digital data to form a single data stream. The single data stream is defined by a block format that allows for indexed recording by a data recorder operating in a record mode. The present invention also provides for demultiplexing the data blocks when the data recorder is operated in a playback mode. A buffer is coupled to a first plurality of channels transmitting asynchronous low-speed digital data to store the low-speed data until a complete message is received. The low-speed data includes identifiers for defining the beginning and end of each complete message. A processor coupled to the buffer places each complete message on the processor's bus. A first digital signal processor (DSP) receives the complete messages over the bus and is programmed to assemble each complete message into data blocks in accordance with the block format. Each data block is identical in size and includes provisions for a header that identifies the data assembled therein. A second DSP has a plurality of I/O ports, each of which has a direct memory access (DMA) associated therewith. One of the I/O ports is coupled to the first DSP to receive each complete message assembled into data blocks. The other I/O ports are coupled to a second plurality of channels transmitting asynchronous high-speed digital data. The DMAs associated with the other I/O ports are configured to assemble the high-speed data into data blocks in accordance with the same block format used for the low-speed messages. The second DSP is coupled via an output port to the data recorder so that each complete message assembled in block format and the high-speed data assembled in block format are transmitted to the data recorder when the data recorder is operated in the record mode. The first DSP can have an I/O port thereof coupled to the data recorder. The DMA associated with this I/O port is configured to route the data blocks passed thereto in accordance with the header associated with the data blocks when the data recorder is operated in the playback mode.

DETAILED DESCRIPTION OF THE INVENTION

Figure 1:
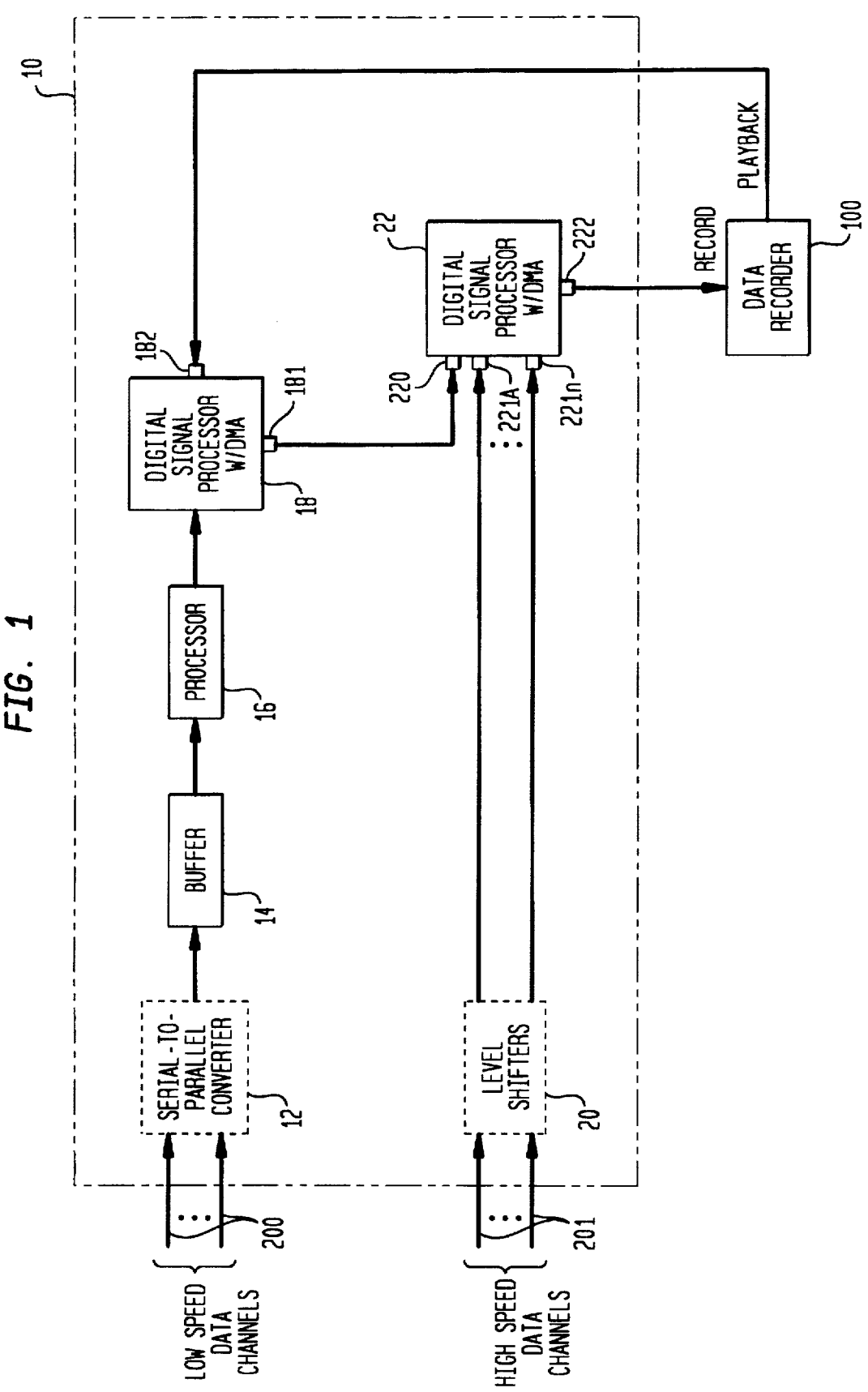
FIG. 1 is a block diagram of the system of the present invention for multiplexing asynchronous high-speed data and asynchronous low-speed data for recordation on one recording medium.

Referring now to the drawings, and more particularly to FIG. 1, a block diagram of the system of the present invention is shown within the dashed-line box referenced by numeral 10. At a minimum, system 10 is designed to multiplex asynchronous low-speed data and asynchronous high-speed data for recordation by data recorder 100. However, as will be explained herein, the present invention can also demultiplex the multiplexed data that is output from data recorder 100 when operating in the playback mode. Data recorder 100 is a high-speed digital data recorder that records and indexes data in specifically sized blocks. Examples of such data recorders include the DCRSI® 107, the DCRSI® 240, and the DIS 120i, manufactured by Ampex Corporation, Redwood City, Calif. Data rates associated with the incoming low-speed and high-speed data can vary. Typically, low-speed data rates are on the order of a few hundred bytes per second while high-speed data rates are on the order of a megabyte or more per second.

The asynchronous low-speed data is typically delivered to system 10 over one or more data lines or channels 200. For purpose of illustration, it will be assumed that each of channels 200 carries a specific type of low-speed data. For example, in terms of a towed sonar array, one channel could carry data on the status of each hydrophone in the array while another channel could be used to transmit the depth of each hydrophone and/or temperature of the surrounding water. This type of low-speed data can be transmitted serially or in parallel. Should the low-speed data be transmitted serially, e.g., RS232 lines, system 10 is provided with serial-to-parallel converter 12 shown in dashed-line form to indicate its optional nature. The low-speed data is converted to a parallel format for processing by the remaining components within system 10.

The low-speed data on each channel is sent in the form of complete messages in which each message has its beginning and end identified within the incoming data stream. For example, for serial data passed over RS232 ports, start-of-message (SOM) and end-of-message (EOM) identifiers are commonly used.

Each complete message of low-speed data is assembled and temporarily stored in buffer 14. Note that if serial-to-parallel conversion is required, converter 12 and buffer 14 can be implemented by a "smart" serial board such as model PCSS-8I manufactured by GTEK, Inc., Bay St. Louis, Mo. Processor 16 monitors buffer 14 and is alerted whenever a complete message has been received on any one of channels 200. Processor 16 then transports each complete message over a bus to the global memory (not shown) of a first digital signal processor (DSP) 18. DSP 18 is any programmable or intelligent digital signal processor having direct memory access for the DSP's I/O ports. Examples of commercially available DSPs having this capability are the Texas Instruments TMS 320C40 DSP chip and chips in the Analog Devices SHARC™ family of DSPs.

DSP 18 is programmed to put each complete message into a data block sized in accordance with the date block format used by data recorder 100. For example, if data recorder 100 is an Ampex DCRSI® 107, DSP 18 is configured or programmed to assemble incoming data into data blocks having 4356 bytes. A portion of each data block is reserved for header information to include type of data and the data block indexing number assigned by DSP 18 for that particular type of low-speed data. For low-speed messages that are smaller than the size of the data block, the remaining portion of the data block is filled with blanks by DSP 18. This allows each message of low-speed data to keep pace with the high-speed data during the recordation process. For low-speed messages that are larger than the size of the data block, DSP 18 fills up the number of data blocks necessary to hold the complete message. Data blocks having complete messages or data blocks filled with portions of complete messages are passed via output port 181 to I/O port 220 of second DSP 22 for multiplexing with the high-speed data as will be explained below.

The asynchronous high-speed data is typically delivered to system 10 over one or more data lines or channels 201. For purpose of illustration, it will be assumed that each of channels 201 carries a specific type of high-speed data. For example, in terms of a towed sonar array, one channel could carry hydrophone data from a first line array, a second channel could carry hydrophone data from a second line array towed adjacent the first line array, etc. In all cases, the incoming data is at a very high rate compared with the low-speed data. Accordingly, channels 201 are generally configured to transfer the high-speed data in parallel fashion. Data on channels 201 may need to be passed through level shifter 20 (shown in dashed-line form to indicate its optional nature) to adjust the voltage levels of the incoming data for compatibility with the other components in system 10. The high-speed data is then passed on to the COM or I/O ports 221A, . . . , 221n, each of which has direct memory access (DMA) associated therewith. DSP 22 can be implemented by the aforementioned Texas Instruments or Analog Devices DSP chips.

Figure 2:
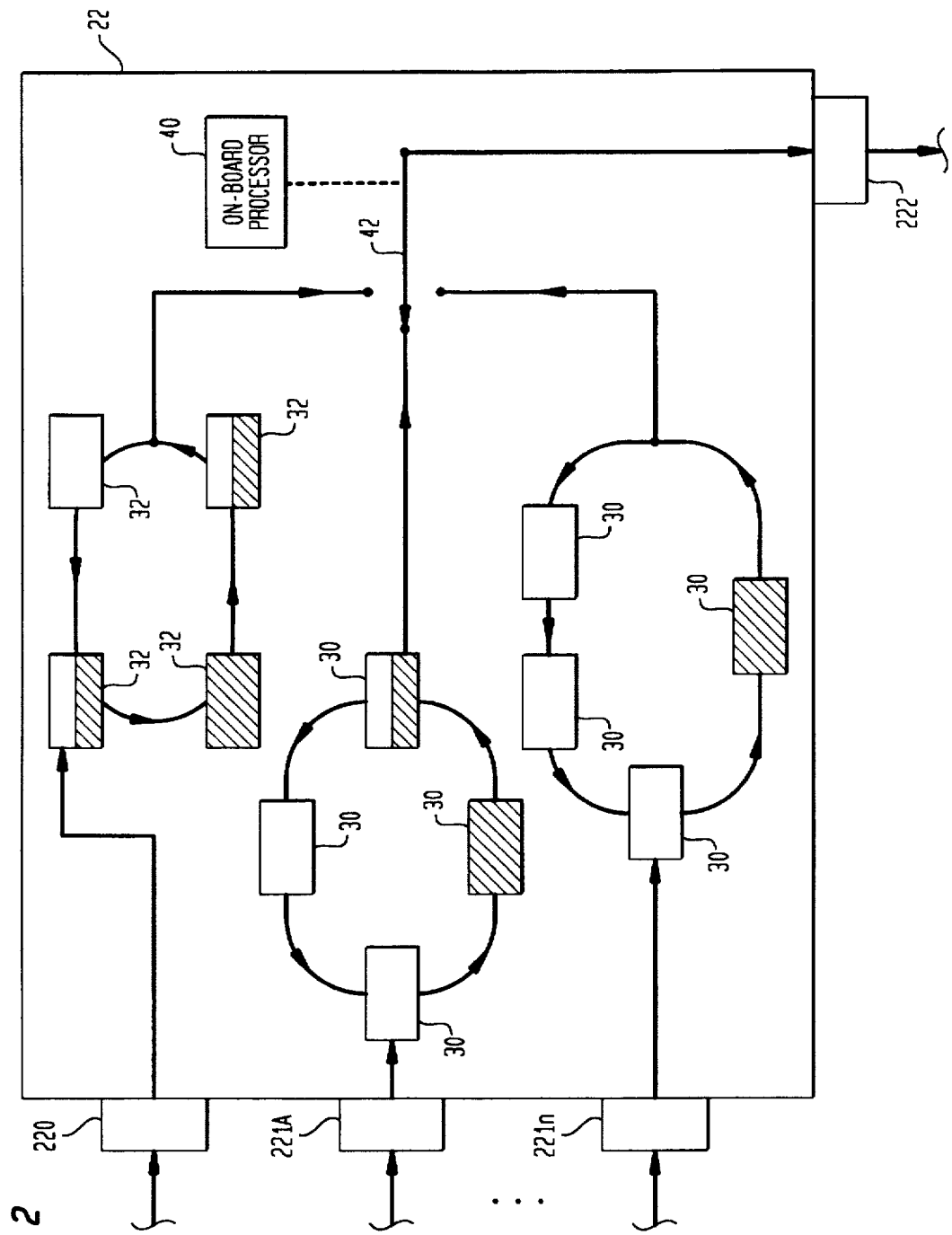
FIG. 2 is a block diagram of the second digital signal processor of the present invention for handling the multiplexing of data blocks containing low-speed data messages with data blocks containing high-speed data.

Referring now to FIG. 2, the operation of DSP 22 will now be explained. As high-speed data comes into one of I/O ports 221A, . . . , 221n, the data is grouped or assembled into data blocks sized in accordance with the data block format used by data recorder 100. The DMA associated with each of I/O ports 221A, . . . , 221n assembles the incoming data into data blocks and buffers the data blocks until such time that data recorder 100 is ready to record same. To do this, the DMA associated with each of I/O ports 221A, . . . , 221n manages its available memory in a revolving ring fashion. Thus, incoming data is assembled into data blocks 30 in a revolving ring of data blocks 30. In terms of FIG. 2, fully hatched data blocks 30 indicate full data blocks, partially hatched data blocks 30 indicate a data block being output from DSP 22, and a non-hatched data block indicates a data block ready to receive incoming high-speed data. Similar to the data blocks used for the low-speed messages, a portion of each data block 30 is reserved for header information to include type of data and the data block indexing number assigned by DSP 22 for that particular type of high-speed data.

As soon as one of data blocks 30 is filled and data recorder 100 is ready to record, on-board processor 40 routes that particular filled data block through switch 42 to data recorder 100 via output port 222. Data blocks 32 associated with the low-speed data received from DSP 18 over I/O port 220 are considered full upon receipt from DSP 18. A "full" data block 32 can contain one complete low-speed message, can be filled with a portion of a low-speed message, or can be partially filled with the end portion of a low-speed message as described above. Completed messages of low-speed data are interleaved with the filled data blocks of high-speed data so that the high-speed data and associated low-speed data are recorded in proximity to one another with respect to time.

Referring again to FIG. 1, if it is desired to operate system 10 in a playback or demultiplexing mode, the recorded data blocks are output to I/O port 182 of DSP 18. I/O port 182 is configured to read the header information associated with each data block and appropriately route same to either a disk file or other output device.

The advantages of the present invention are numerous. High-speed and low-speed data are multiplexed without regard to individual data clocks. The system can handle any aggregate data rate within the capability of the data recorder and the DSP multiplexing the data blocks associated with the high-speed and low-speed data. For example, the Texas Instruments DSP chip operates from 0–16 MHz with each I/O port being 8 bits wide so that data rates can range between 0 and 16 megabytes. The block format used to assemble the data is compatible with the data recorder and is easily implemented by the intelligent DSPs. The simple headers used by each data block provide for efficient demultiplexing.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A multiplexing system comprising:

a buffer coupled to a first plurality of channels transmitting asynchronous low-speed digital data, said buffer storing said low-speed digital data until a complete message is received, wherein said low-speed digital data includes identifiers for defining the beginning and end of each said complete message;

a processor having a bus coupled to said buffer, said processor placing each said complete message on said bus;

a first digital signal processor (DSP) coupled to said bus and programmed to assemble each said complete message into data blocks in accordance with a block format in which each of said data blocks is of an identical size; and a second DSP having a plurality of I/O ports, each of said plurality of I/O ports having a direct memory access (DMA) associated therewith, one of said plurality of I/O ports coupled to said first DSP for receiving each said complete message assembled into said data blocks and others of said plurality of I/O ports coupled to a second plurality of channels transmitting asynchronous high-speed digital data, said DMAs associated with said others of said plurality of I/O ports configured to assemble said high-speed digital data into data blocks in accordance with said block format, said second DSP having an output port coupled to said DMAs associated with said one and said others of said plurality of I/O ports for transmission of each said complete message assembled in said block format and said high-speed digital data assembled in said block format.

2. A multiplexing system as in claim 1 wherein said low-speed digital data is transmitted serially over said first plurality of channels, said multiplexing system further comprising a serial-to-parallel converter coupled between said plurality of data channels and said buffer.

3. A multiplexing system as in claim 1 further comprising a voltage level shifter coupled between said second plurality of channels and said second DSP for adjusting voltage levels of said high-speed digital data.

4. A system for multiplexing high-speed digital data and low-speed digital data to form a single data stream defined by a block format for indexed recording by a data recorder operating in a record mode, and for demultiplexing said data blocks when said data recorder is operated in a playback mode, said system comprising:

a buffer coupled to a first plurality of channels transmitting asynchronous low-speed digital data, said buffer storing said low-speed digital data until a complete message is received, wherein said low-speed digital data includes identifiers for defining the beginning and end of each said complete message;

a processor having a bus coupled to said buffer, said processor placing each said complete message on said bus;

a first digital signal processor (DSP) coupled to said bus and programmed to assemble each said complete message into data blocks in accordance with said block format in which each of said data blocks is of an identical size and includes a header that identifies the data assembled therein;

a second DSP having a plurality of I/O ports, each of said plurality of I/O ports having a direct memory access (DMA) associated therewith, one of said plurality of I/O ports coupled to said first DSP for receiving each said complete message assembled into said data blocks and others of said plurality of I/O ports coupled to a second plurality of channels transmitting asynchronous high-speed digital data, said DMAs associated with said others of said plurality of I/O ports configured to assemble said high-speed digital data into data blocks in accordance with said block format, said second DSP having an output port coupled between said DMAs associated with said one and said others of said plurality of I/O ports and said data recorder for transmission of each said complete message assembled in said block format and said high-speed digital data assembled in said block format to said data recorder when said data recorder is operated in said record mode; and said first DSP having an I/O port coupled to said data recorder and having a DMA associated therewith configured to route said data blocks passed thereto in accordance with said header associated therewith when said data recorder is operated in said playback mode.

5. A multiplexing system as in claim 4 wherein said low-speed digital data is transmitted serially over said first plurality of channels, said multiplexing system further comprising a serial-to-parallel converter coupled between said plurality of data channels and said buffer.

6. A multiplexing system as in claim 4 further comprising a voltage level shifter coupled between said second plurality of channels and said second DSP for adjusting voltage levels of said high-speed digital data.

7. A method of multiplexing high-speed digital data and low-speed digital data to form a single data stream defined by a block format for indexed recording by a data recorder operating in a record mode, said method comprising the steps of:

providing a first digital signal processor (DSP) coupled to a first plurality of channels transmitting asynchronous low-speed digital data, wherein said low-speed digital data includes identifiers for defining the beginning and end of complete messages;

assembling each of said complete messages into data blocks in accordance with a block format in which each of said data blocks is of an identical size and includes a header that identifies the data assembled therein;

providing a second DSP having a plurality of I/O ports, each of said plurality of I/O ports having a direct memory access (DMA) associated therewith;

coupling one of said plurality of I/O ports to said first DSP for receiving each of said complete messages assembled into said data blocks;

coupling others of said plurality of I/O ports to a second plurality of channels transmitting asynchronous high-speed digital data;

assembling said high-speed digital data into data blocks in accordance with said block format; and transmitting each of said complete messages assembled in said block format and said high-speed digital data assembled in said block format to said data recorder operating in said record mode.

8. A method according to claim 7 further comprising the steps of:

providing an I/O port of said first DSP that has a DMA associated therewith, said I/O port of said first DSP coupled to said data recorder;

operating said data recorder in a playback mode, wherein data is passed to said I/O port of said first DSP in the form of said data blocks; and routing data in each of said data blocks in accordance with said header associated with each said of said data blocks.

\* \* \* \* \*